United States Patent [19]

Koch et al.

[11] Patent Number: 4,463,405

[45] Date of Patent: Jul. 31, 1984

[54] FAIL SAFE SURGE ARRESTER

[75] Inventors: Robert E. Koch; Earl W. Stetson, both of Pittsfield, Mass.

[73] Assignee: Electric Power Research Institute, Inc., Palo Alto, Calif.

[21] Appl. No.: 235,906

[22] Filed: Feb. 19, 1981

[51] Int. Cl.[3] .............................................. H02H 9/04

[52] U.S. Cl. .................................... 361/135; 361/127; 315/36

[58] Field of Search ............... 361/135, 134, 136, 126, 361/127, 128, 129, 130, 120, 117; 315/36; 313/231.1, 231.2, 221, 174, 177

[56] References Cited

U.S. PATENT DOCUMENTS

| | | | |
|---|---|---|---|
| 2,546,006 | 3/1951 | Leonard et al. . | |
| 3,009,983 | 11/1961 | Oppel . | |
| 3,189,710 | 6/1965 | Lawrence et al. | 361/127 X |
| 3,214,634 | 10/1965 | Osmundsen et al. | 315/36 |
| 3,727,108 | 4/1973 | Westrom | 361/127 |
| 4,001,651 | 1/1977 | Kershaw, Jr. | 361/127 X |
| 4,100,588 | 7/1978 | Kresge | 361/127 |
| 4,223,366 | 9/1980 | Sweetana, Jr. | 361/127 |

FOREIGN PATENT DOCUMENTS

| | | | |
|---|---|---|---|
| 1054738 | 2/1954 | France . | |

*Primary Examiner*—Patrick R. Salce
*Attorney, Agent, or Firm*—Flehr, Hohbach, Test, Albritton & Herbert

[57] ABSTRACT

A surge arrester including an outer porcelain housing and an ablative heat shield liner is disclosed herein along with a number of techniques for making the surge arrester break resistant. In accordance with one of these techniques, a blow out or relief valve is provided on at least one end of the arrester housing for venting internal pressure due to electrical arcing therein. In this embodiment, an arrangement is provided for preventing the components therein from escaping during the venting procedure. The liner is constructed of a material which is sufficiently ablative to produce its own gas within the housing in response to electrical arcing therein.

3 Claims, 5 Drawing Figures

FAIL SAFE SURGE ARRESTER

The present invention relates generally to a surge arrester of the type including an outer housing such as porcelain which has the tendency to fracture when subjected to excessive internal pressure and temperatures caused by internal arcing and more particularly to different techniques for preventing the housing from breaking in the event of such a malfunction.

A typical surge arrester is one which includes (1) an outer elongated housing of relatively rigid electrically insulating material, usually porcelain because of its excellent non-tracking characteristics, (2) electrical terminals at opposite ends of the housing and (3) means including a number of arrester components located within the housing. These internal components provide a high or low electrical impedance path between the terminals depending upon the voltage across the latter. More specifically, if the surge arrester is subjected to an abnormally high voltage, for example lightning, it is designed to discharge a corresponding surge current between its terminals until the abnormal voltage is removed. Thereafter, a follow current is typically produced with the tendency to flow through the arrester. Under normal conditions, this follow current is interrupted by the arrester without damage to the latter because of the lower, normal voltage which is applied thereto at that time. However, occasionally the lightning or follow current flowing into the arrester causes block or gap damage such that a short circuit arc is established within. Under these circumstances, the heat and pressure from the electrical arcing can cause the arrester housing, especially a porcelain housing, to break unless this is prevented.

A method suggested for preventing the arrester housing from breaking is disclosed in U.S. Pat. No. 3,214,634 (Osmundsen, et al). This patent described a drop-out device and a gas absorbing internal liner. However, there are other approaches which use gas venting techniques such as the one disclosed in U.S. Pat. No. 4,100,588 (Kresge). Another approach is to quench the arc itself as in U.S. Pat. No. 2,546,006 (Leonard et al). In this latter reference, an inner tubular member capable of evolving gas is provided. As soon as an arc strikes in this arrester, a large quantity of relatively un-ionized gas is evolved from the tubular member. This gas mixes turbulently with the gases from the arc and is discharged in a blast in the direction of the arc for extinguishing the latter and deionizing the arc path. This device is an expulsion arrester which is currently obsolete partly because of its very limited capability to interrupt 60 Hz follow current.

Still other techniques for preventing the ceramic or like housing of a surge arrester from breaking are disclosed herein and, in accordance with one object of the present invention, these latter techniques are uncomplicated in design, economical to provide and reliable in use.

In accordance with another object of the present invention, one of the techniques disclosed herein provides a surge arrester including an outer ceramic or like housing and means for venting the housing for preventing the latter from breaking while, at the same time, preventing the internal arrester components from leaving the housing.

Another object of the present invention is to provide another technique for preventing the housing of a surge arrester from breaking, particularly a technique in which the pressure within the arrester housing is increased at a greater rate than would otherwise result from internal electrical arcing itself, whereby to cause the arrester housing to vent at a more rapid rate than would otherwise be the case.

The surge arrester disclosed herein is one which includes an outer elongated housing of relatively rigid electrically insulating material, for example ceramic, terminals at opposite ends of one housing and means including a number of arrester components located within the housing for providing a high or low electrical impedance path between the terminals, depending upon the voltage across the latter. All of these features are provided in each embodiment disclosed herein regardless of the particular technique used for preventing the arrester housing from breaking. In accordance with the invvention, a pressure release arrangement is provided along with means for preventing the components within the housing from escaping out the latter. A thermal insulating liner is also provided and formed of a material which is sufficiently ablative to provide its own gas in response to and as a result of electrical arcing so as to cause rapid venting to occur and to protect the housing from thermal shock. For purposes of the present invention, the term ablative (or ablation) is used herein in its conventional way. For example, one acceptable definition may be found in Condensed Chemical Dictionary, 8th Ed., revised by Gessner G. Hawley, published by Van Nostrand Reinhold Co. on page 1. There, it is stated:

> ABLATION. The rapid removal of heat (5000° to 10,000° F.) from a metallic substrate by pyrolysis of a material of low thermal conductivity, which is able to absorb or dissipate the heat while being decomposed to gases and porous char. Ablative materials applied to the exterior of temperature-sensitive structures isolate them from hyperthermal effect of the environment. Interaction of a high-energy environment with the exposed ablative material results in a small amount of sacrificial erosion of the surface material. The attendant energy-absorption processes control the surface temperature and greatly restrict the flow of heat into the substrate.
>
> Ablative materials are usually composed of a plastic, ceramic, or glass-reinforced plastic, e.g., polyethylene, polytetrafluoroethylene, phenolics, foamed plastics, fused silica, zirconia, magnesia, foamed ceramics, and various types of ceramic-metal composites. Most notable applications are in protecting aerospace vehicles during aerodynamic heating due to hypersonic flight in the atmosphere; insulating sections of rocket motors from hot propulsion gases; resisting the intense radiant heating effects of thermonuclear blasts; and providing thermal protection for structural materials exposed to excessively high temperatures.

The various techniques just recited and the surge arresters associated therewith will be described in more detail hereinafter in conjunction with the drawing wherein.

Figure 1:
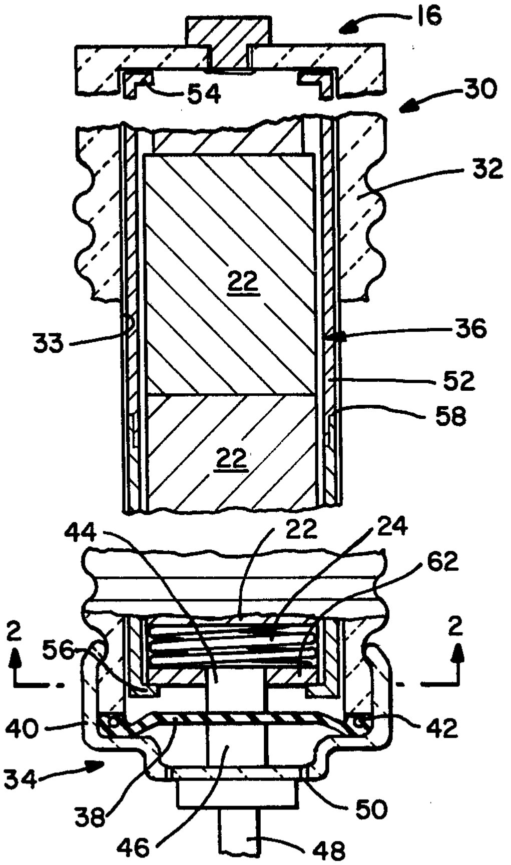
FIG. 1 is a vertical sectional view of a surge arrester designed in accordance with the present invention.
Figure 2:
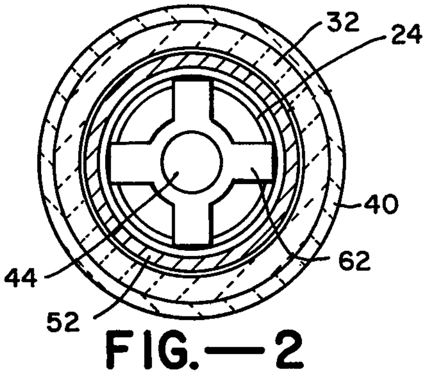
FIG. 2 is a cross sectional view of the surge arrester of FIG. 1, taken generally along line 2-2 in FIG. 1.

Turning now to FIGS. 1 and 2 attention is directed to a surge arrester which is designed to prevent its housing from breaking. This arrester which is generally indicated at 30 includes its own outer elongated housing 32 of relatively rigid electrically insulating material, specifically porcelain in a preferred embodiment defining an internal housing chamber 33. The surge arrester 30 may also include a closure arrangement 16 at one end of chamber 33 serving as one line terminal. A second line terminal to be discussed below is located at the other end of the chamber. Chamber 33 contains suitable and readily providable means including a plurality of arrester components for providing a high or low electrical impedance path between its terminals, depending upon the voltage across these terminals. More specifically, these components which include, for example, non-linear resistance blocks 22, an electrically conductive spring member 24, and like components serve to provide a high impedance path between the terminals under normal voltage conditions, that is, so long as the potential between the two terminals remains at or below the normal operating potential for which the surge arrester is designed. However, should the arrester be subjected to an abnormally high surge voltage, for example lightning, the components within chamber 33 provide a low impedance path to ground for the passage of surge current thereto.

As will be described in more detail below, surge arrester 30 includes a bottom closure arrangement 34 which is designed in accordance with the present invention to relieve housing chamber 33 of internal pressure caused by electrical arcing before housing 32 has a chance to break and which also serves as the second terminal mentioned above. As will also be seen, the surge arrester includes an internal, ablative heat shield or liner 36 designed in accordance with the present invention.

Referring specifically to the closure arrangement 34, it can be seen from FIG. 1 that this arrangement includes a sealing disc 38 extending entirely across the otherwise open bottom end of housing 32. This disc is held in place by a bottom cover cap 40 which is constructed of a resilient, electrically conductive material, for example aluminum, and which is designed to snap fit around and tightly engage the bottom end section of housing 32 over disc 38 for holding the latter in place. In this regard, an O-ring 42 or other suitable sealing means is provided between disc 38 and the bottom, downwardly facing edge of housing 32 for providing a mositure seal therebetween. An electrically conductive spacer 44 serving as a contact is disposed between the bottommost end of the operating components in chamber 33 and the inner surface of disc 38. A similar electrically conductive spacer 46 which also serves as a contact is disposed between the outer surface of membrane 38 and the inner surface of cover cap 40. The outer surface of cap 40 is shown in contact with a ground lead 48. During normal operation of surge arrester 30, disc 38 serves as a moisture seal across the otherwise opened bottom end of chamber 33. In a preferred embodiment, disc 38 is constructed of stainless steel. The end cap is designed so that it will blow off under relatively low internal pressure conditions.

Attention is directed to FIG. 2 in conjunction with FIG. 1. As seen in this latter figure, the liner 36 comprises a longitudinally extending main body 52 extending the length of chamber 33 between the internal operating components within the chamber and the inner surface of the housing 32. The liner which can be constructed of epoxy resin impregnated filament wound fiberglass is of any suitable ablative material, preferably one selected from the group of ablative materials selected from paper and organic resins. This liner includes opposite end sections 54 and 56 extending inwardly, that is, normal to main body 52. These end sections are located at opposite ends of the internal operating components of the arrester and preferably extend inwardly a sufficient distance to prevent the operating components from escaping out of the chamber during venting of the latter, although as will be discussed below, other means may be provided to aid in meeting this objective. In any event, for purposes of assembly, the ablative heat shield liner 36 is initially formed from two sections which are cemented or otherwise bonded together at an intermediate lap joint indicated generally at 58.

While the turned in end sections 54 and 56 may be adequate to retain the internal operating components within housing chamber 33, in a preferred embodiment, a relatively rigid web-like member 62 is provided to aid in accomplishing this end. This web-like member is located between the bottom end of the internal components within housing chamber 33 and turned in end section 56 of liner body 52. As best seen in FIG. 2, the web-like member is sufficiently open so as not to inhibit venting of the chamber and yet it is sufficiently closed to prevent the internal components within the latter from escaping. At the same time, a central opening is provided in the web-like member for receiving electrically conductive spacer 44 so that the latter can electrically interconnect the bottom end of the internal arrester components and disc 38. The single bottom end vent and internal part retaining system provided by closure arrangement 34 and the end 56 of the liner may be limited in its capability to prevent housing breakage above a specific fault current level, such as 1500 amps. This can be overcome by providing the same pressure relief closure arrangement 34 and internal part retaining system at each end of the arrester. This design will provide a fail safe surge arrester up to fault currents of at least 20,000 amps.

Figure 3:
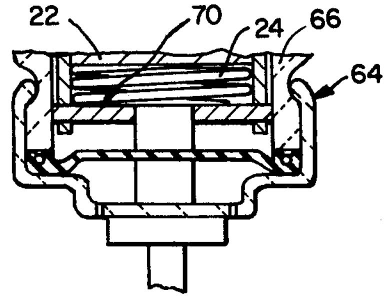
FIG. 3 is a vertical sectional view of the end portion of a surge arrester designed in accordance with another embodiment of the present invention.
Figure 4:
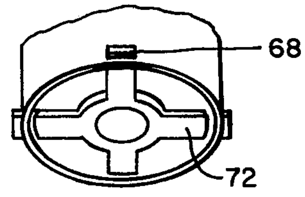
FIG. 4 is a perspective view of the arrester end section illustrated in FIG. 3, specifically showing the end of the arrester.

Referring to FIGS. 3 and 4, attention is directed to a modified version of the component retaining technique associated with surge arrester 30. In FIGS. 3 and 4, only the bottom end of an arrester generally indicated at 64 is shown. With the exception of its ablative heat shield or liner 36 and web-like member, the arrester 64 may be identical to arrester 30. The ablative heat shield or liner forming part of arrester 64 is generally indicated at 66 and includes straight end sections. As best seen in FIG. 4, the bottom end section of the liner includes a plurality of through openings 68 and its associated web-like member generally indicated at 70 includes an equal plurality of spoke-like projections 72. These projections extend into associated openings 68 in liner 66 for maintaining the web-like member in place under and against the bottom end of the internal operating components of the arrester.

Figure 5:
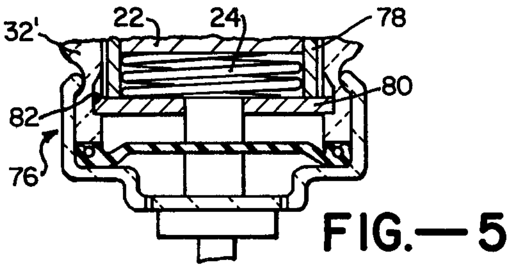
FIG. 5 is a vertical sectional view of the end portion of a surge arrester designed in accordance with still another embodiment of the present invention.

Referring to FIG. 5 another modified version of the component retaining technique associated with arrester 30 in shown. In FIG. 5, only the bottom end of the arrester generally indicated at 76 is illustrated. With the exception of its liner and web-like member, and one aspect of housing 32, arrester 76 may be identical to arrester 30. The ablative heat shield or liner forming part of arrester 76 is generally indicated at 78 and includes straight end sections without through holes as in liner 66. The end of liner 78 rests against an associated web-like member 80 which is held in place within housing 32' by means of an annular groove 82 formed in the inner surface of the housing. More specifically, web-like member 80 is disposed within the groove which is larger longitudinally than the thickness of the web-like member to provide ready insertion of the latter therein.

In any of the embodiments illustrated in FIGS. 1-5, its associated ablative shield or liner may be constructed of a material which is sufficiently ablative to produce its own gases in response to and as a result of internal electrical arcing. In this way, during electrical arcing, the pressure within the associated housing chamber will increase at a faster rate than would otherwise be the case. Hence, the housing chamber will be vented more rapidly than would be the case if the pressure resulted only from internal arcing alone. Any suitable ablative materials which also display the required thermal insulating capability can be provided for use in forming the ablative heat shield or liner 36, 66 and (or) 78 Examples of these materials are organics such as paper and phenolic, acrylic, epoxy, acetal or nitrocellulose resins. In this regard, the inner liner itself could be entirely eliminated and replaced with an ablative, thermal insulating coating on the inside surface of the outer housing. In addition, the liner could include a reflective layer serving as a heat shield or, if the liner is eliminated, a double coating could be used on the inner surface of the housing. This double coating might consist of an insulating aluminum paint or a filler such as titanium dioxide in combination with the ablative material.

What is claimed:

1. A surge arrester comprising: an outer elongated housing of relatively rigid electrically insulating material defining a longitudinal chamber from one end of the housing to an opposite end thereof; first and second chamber closing means respectively including electrical terminals located at said chamber ends; means including a plurality of arrester components in series relationship with one another within said housing chamber for providing a high or low electrical impedance path between said terminals depending upon the voltage across the latter; a liner between said arrester components and the inner surface of said housing; sealing means forming part of at least one of said chamber closing means for opening an associated end of said chamber to the ambient surrounding to thereby vent said chamber in response to a predetermined increase in pressure within the latter; and component retaining means located at said associated chamber end for preventing said components from escaping out the latter during venting of said chamber, said component retaining means including an end section of said liner located at said associated chamber end adjacent one end of said components, said liner end section including a plurality of openings therethrough, and a relatively rigid web-like member including a main body sufficiently open so as not to inhibit venting of said chamber and outward projections extending into said end section openings for securing the main body of said web-like member in place.

2. A surge arrester comprising: an outer elongated housing of relatively rigid electrically insulating material defining a longitudinal chamber from one end of the housing to an opposite end thereof; first and second chamber closing means respectively including electrical terminals located at said chamber ends for closing said chamber so long as the pressure therein remains below a certain level; means including a plurality of arrester components in series relationship with one another within said housing chamber for providing a high or low electrical impedance path between said terminals depending upon the voltage across the latter; a liner between said arrester components and the inner surface of said housing; sealing means forming part of at least one of said chamber closing means for opening an associated end of said chamber to the ambient surrounding to thereby vent said chamber in response to a predetermined increase in pressure within the latter sufficient to raise said pressure to said certain level; and component retaining means located at said associated chamber end for preventing said components from encaping out the latter during venting of said chamber; said liner being constructed of a material sufficiently ablative to provide its own gas within said chamber in response to electrical arcing therein whereby to add to said pressure within said chamber in order to reach said predetermined increase, said component retaining means including an end section of said liner located at said associated chamber end adjacent one end of said components, said liner end section including a plurality of openings therethrough, and a relatively rigid web-like member including a main body sufficiently open so as not to inhibit venting of said chamber and outward projections extending into said end section openings for securing the main body of said web-like member in place.

3. A surge arrester comprising: an outer elongated porcelain housing defining a longitudinal chamber from one end of the housing to an opposite end thereof; first and second chamber closing means respectively including electrical terminals located at said chamber ends for closing said chamber so long as the pressure therein remains below a certain level; means including a plurality of arrester components in series relationship with one another within said housing chamber for providing a high or low electrical impedance path between said terminals depending upon the voltage across the latter; sealing means forming part of one of said chamber closing means for opening an associated end of said chamber to the ambient surroundings and thereby venting said chamber in response to a predetermined increase in pressure within the latter sufficient to raise said pressure to said certain level, said sealing means including a moisture impervious, electrically conductive membrane which is sufficiently weak structurally to break as a result of said increase in pressure within said housing; a thermal insulating liner between said arrester components and the inner surface of said porcelain housing, said liner being constructed of a material which is sufficiently ablative to provide its own gas within said chamber in response to electrical arcing therein, whereby to contribute at least in part to said increase in pressure within said chamber; and component retaining means located at said associated chamber end for preventing said components from escaping out the latter during venting of said chamber, said component retaining means including an end section of said liner located at said associated chamber end adjacent one end of said components and a relatively rigid web-like member located within said chamber adjacent said one end of said arrester components and interlocked to said liner end section, said web-like member including a main body sufficiently open so as not to inhibit venting of said chamber, said liner end section including a plurality of openings therethrough and said web-like member including a plurality of projections extending outward from its main body and into said end section openings for securing said main body in place.

* * * * *